Patented Nov. 23, 1948

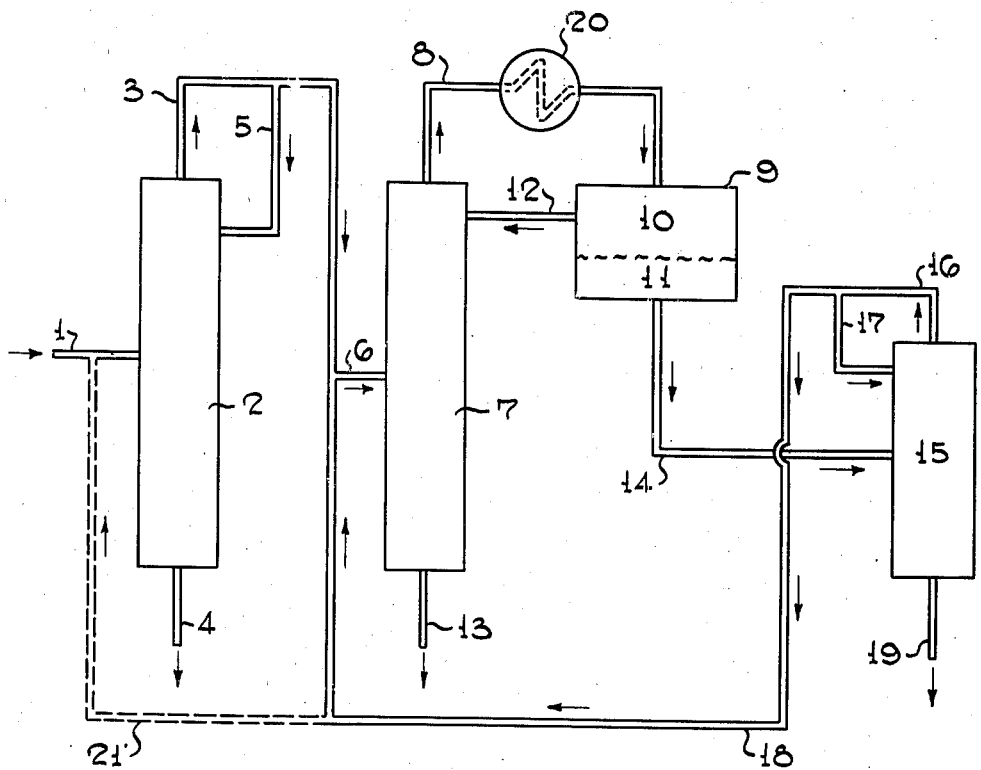

2,454,447

UNITED STATES PATENT OFFICE 2,454,447

DEHYDRATION OF METHYL ETHYL KETONE BY AZEOTROPIC DISTILLATION UNDER SUPERATMOSPHERIC PRESSURE

William S. Harney, Jr., Elizabeth, and Erwin H. Amick, Jr., Linden, N. J., assignors to Standard Oil Development Company, a corporation of Delaware Application December 28, 1946, Serial No. 718,920

3 Claims. (Cl. 202—42)

1

This invention relates to the purification of methyl ethyl ketone, particularly to the removal of water therefrom.

At the present time, methyl ethyl ketone is prepared commercially by the dehydrogenation of secondary butyl alcohol. The crude methyl ethyl ketone product contains water and secondary butyl alcohol as impurities which must be removed from the ketone product. The removal of secondary butyl alcohol can be accomplished by conventional fractionation procedure. However, the removal of water from the system is complicated by the formation of a methyl ketone-water binary azeotrope. Conventional methods remove the water with the ketone as distillate from a column. This stream must be further processed to recover the ketone. This is usually done by a salt dehydration followed by another fractional distillation. Another method is that of azeotropic distillation using an appropriate entrainer, such as an ether or benzene. This method presents the possibility of contaminating the ketone product with the entrainer but is otherwise generally successful.

Our invention is concerned with the removal of water from methyl ethyl ketone aqueous mixtures by means of distillation under increased pressure. We have found that the composition of the ketone-water binary azeotrope distillate varies with the pressure on the distillation system.

As the distillation pressure is increased, the water content of the azeotropic distillate increases and on condensation of the distillate, the distillate remains homogeneous. However, as the pressure is further increased, a distillation pressure is reached where the distillate on condensation and cooling to room temperature (25° C.) separates into two phases. The distillate drum in which the condensate collects can be operated at atmospheric pressure or under increased pressure. Generally, it is operated at the same pressure as the distillation column pressure. The upper layer of the phase separation consists of methyl ethyl ketone saturated with water and the lower layer of the phase separation consists of water saturated with methyl ethyl ketone. The dehydration of the can thus be effected by operating the distillation column at a pressure sufficiently great to accomplish phase separation of the condensed distillate and by selectively removing this lower layer from the system while refluxing the ketone rich upper layer to the pressure distillation zone. The desired water-free methyl ethyl ketone product is

2 withdrawn as bottoms from the pressure distillation column.

To illustrate the invention, reference is made to the accompanying drawing which is a diagrammatic view of the flow plan of the process.

Crude methyl ethyl ketone containing water, secondary butyl alcohol and methyl ethyl ketone is led through line 1 to fractionator 2 where water and ketone, in the form of ketone-water binary azeotrope, are taken overhead as distillate through line 3. Secondary butanol is removed as bottoms through line 4. Part of the overhead distillate may be returned from line 3 to the tower as reflux through line 5. The distillate comprising methyl ethyl ketone and water from line 3 enters the pressure column 7 through line 6 where it is distilled under pressure. As the pressure is increased, the water content of the binary azeotrope distillate will have been increased until the distillate leaving the pressure column through line 8 will, after condensing in condenser 20 and cooling to room temperature (25° C.), separate into two phases in decanter 9. Normal pressure may be restored before the condensate enters the decanter although it is equally feasible to keep the decanter under pressure. In actual practice, the liquid is condensed under the operating pressure of the distillation tower and the condensate run to a settling drum or reflux drum operated under this increased pressure or at atmospheric pressure. The upper layer 10 consists of ketone saturated with water and is refluxed to the column 7 through line 12. The lower layer 11 consists of water saturated with ketone and is removed from the system via line 14 to a tower 15 where excess water is removed as bottoms through line 19, and the ketone, concentrated to the ketone-water binary, is taken overhead through line 16 and returned to the pressure column 7 via line 18, or to fractionator 2 via line 21. Part of the overhead in line 16 may be removed as reflux via line 17. Anhydrous methyl ethyl ketone is recovered as bottoms from pressure column 7 via line 13. Tower 15 may be operated at atmospheric or reduced pressure or increased pressure. Column 7 may be operated at pressures ranging from 20 lbs. to 200 lbs./sq. in. As a variation, tower 15 could also be operated under pressure which would produce an overhead which would separate into two layers on condensation. In this manner, the same decanter vessel could be used for both towers 7 and 15. The upper layer could be refluxed to tower 7 and the lower layer refluxed to tower 15.

The following tabulated data show the effect of pressure on the MEK-H₂O binary azeotrope.

*Effect of pressure on the MEK-H₂O binary azeotrope*

| Pressure, mm. Hg | Boiling Point, °C. | Wt. per cent Water in the Distillate |
|---|---|---|
| 767.8 | 74.0 | 11.2 |
| 940.8 | 79.3 | 12.1 |
| 1021.8 | 82.1 | 12.1 |
| 1242.8 | 88.0 | 12.5 |

The distillates obtained at 767.8 mm. and at 940.8 mm. were perfectly homogeneous. The distillate obtained at 1021.8 mm. mercury absolute pressure was slightly cloudy when condensed and cooled to room temperature (25° C.). The distillate recovered at 1242.8 mm. mercury absolute pressure separated into two phases on condensation and cooling to room temperature. As will be seen from the table, the percentage of water in the distillate increases with increase in distillation pressure until phase separation of the distillate occurs. The lower layer resulting from the phase separation, as previously mentioned, consists of water saturated with ketone. This layer contains approximately 75-80% water, and the removal of this layer from the system produces the desired dehydration. This water-rich layer can be fractionated to concentrate the ketone to the composition of ketone-water binary at atmospheric (or reduced pressure) and this distillate can be returned to the pressure dehydrating column 7.

We have found that more rapid dehydration can be accomplished by using higher pressures on the pressure dehydrating columns. In this regard, pressures from 15 lbs. gauge to 200 lbs. gauge may be used.

The process has been described in particular with regard to the dehydration of methyl ethyl ketone. Our pressure distillation effect is advantageous particularly with methyl ethyl ketone because the water content of the binary azeotrope of methyl ethyl ketone and water is very nearly equal to the saturation limit of water in the ketone (about 12%) and slight changes in the composition of the binary azeotrope produced by distillation under pressure exceeds the water saturation limit and causes two liquid phases to form. Acetone does not form a water binary azeotrope but it is extremely difficult to separate to small concentrations of water. It is known that acetone and water form a binary azeotrope at pressures above atmospheric; but since acetone and water are completely miscible, no phase separation would occur on condensation and no dehydration could be effected in the manner described for methyl ethyl ketone. Dehydration could be effected by removing the homogeneous acetone-water binary overhead under pressure distillation, discharging dry acetone from the bottom of the column and processing the water-rich overhead stream further to remove water before recycling. Our process could be applied to the dehydration of ketones higher than methyl ethyl ketone although the higher ketones absorb only small amounts of water. Where they do form binary azeotropes with water, we have found that increasing the distillation pressure produces an increase in dehydration because the azeotrope composition is changed.

Although this disclosure has been applied to the separation of mixtures of water and methyl ethyl ketone resulting from the dehydrogenation of secondary butyl alcohol, the method disclosed may be applied in separating any azeotropic mixture of water and methyl ethyl ketone regardless of the source or exact composition of the mixture.

Having described our invention, what we claim and desire to secure by Letters Patent, is as follows:

1. A method of recovering substantially anhydrous methyl ethyl ketone from an aqueous mixture of the same which comprises conducting the aqueous mixture to a distillation zone, maintaining an absolute pressure of at least 20 lbs. per sq. in. in said distillation zone, condensing the distillate whereby a methyl ethyl ketone-rich phase and a water-rich phase are formed, separating the resulting phases and refluxing the methyl ethyl ketone-rich phase to the distillation zone and recovering substantially anhydrous methyl ethyl ketone as bottoms from the distillation zone.

2. A method of recovering substantially anhydrous methyl ethyl ketone from an aqueous mixture of the same which comprises conducting the aqueous mixture to a distillation zone, maintaining an absolute pressure of at least 20 lbs. per sq. in. in said distillation zone, condensing the distillate whereby a methyl ethyl ketone-rich phase and a water-rich phase are formed separating the resulting phases, refluxing the methyl ethyl ketone-rich phase to the distillation zone, recovering substantially anhydrous methyl ethyl ketone as bottoms from the distillation zone, concentrating the water-rich phase to at least the composition of the methyl ethyl ketone-water azeotrope and returning the azeotrope to the distillation zone.

3. A method of recovering substantially anhydrous methyl ethyl ketone from an aqueous mixture of the same which comprises conducting the aqueous mixture to a distillation zone, maintaining an absolute pressure between 20 lbs. per sq. in. and 200 lbs. per sq. in. in said distillation zone, condensing the distillate whereby a methyl ethyl ketone-rich phase and a water-rich phase are formed, separating the phases and returning the methyl ethyl ketone-rich phase as reflux, to the distillation zone and recovering substantially anhydrous methyl ethyl ketone as bottoms from the distillation zone.

WILLIAM S. HARNEY, JR.
ERWIN H. AMICK, JR.

REFERENCES CITED

The following references are of record in the file of this patent:

UNITED STATES PATENTS

| Number | Name | Date |
|---|---|---|
| 1,911,832 | Lewis | May 30, 1933 |
| 2,358,193 | Wentworth | Sept. 12, 1944 |

OTHER REFERENCES

"Methyl Ethyl Ketone," published 1938 by Shell Chemical Company, San Francisco, California. (Copy in Div. 25, pages 25-31.)